United States Patent
Forsberg et al.

(10) Patent No.: US 8,838,972 B2
(45) Date of Patent: *Sep. 16, 2014

(54) EXCHANGE OF KEY MATERIAL

(75) Inventors: Dan Forsberg, Helsinki (FI); Lauri Tarkkala, Espoo (FI)

(73) Assignee: Intellectual Ventures I LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 13/613,204

(22) Filed: Sep. 13, 2012

(65) Prior Publication Data

US 2013/0007457 A1    Jan. 3, 2013

Related U.S. Application Data

(62) Division of application No. 11/186,901, filed on Jul. 22, 2005, now Pat. No. 8,295,488.

(30) Foreign Application Priority Data

Apr. 15, 2005 (FI) ...................................... 20050393

(51) Int. Cl.
| | |
|---|---|
| *H04L 9/00* | (2006.01) |
| *H04L 9/32* | (2006.01) |
| *H04K 1/00* | (2006.01) |
| *H04W 36/00* | (2009.01) |
| *H04W 12/02* | (2009.01) |
| *H04W 12/04* | (2009.01) |
| *H04W 12/06* | (2009.01) |
| *H04W 12/08* | (2009.01) |
| *H04W 36/02* | (2009.01) |
| *H04L 29/06* | (2006.01) |

(52) U.S. Cl.
CPC .............. *H04W 12/02* (2013.01); *H04W 12/04* (2013.01); *H04W 12/06* (2013.01); *H04W 12/08* (2013.01); *H04W 36/0016* (2013.01); *H04W 36/02* (2013.01); *H04L 2209/80* (2013.01); *H04L 63/0428* (2013.01); *H04L 63/06* (2013.01)
USPC ........... 713/171; 380/270; 380/277; 455/436; 713/169

(58) Field of Classification Search
None
See application file for complete search history.

(56) References Cited

U.S. PATENT DOCUMENTS

| | | | |
|---|---|---|---|
| 6,876,747 | B1 | 4/2005 | Faccin et al. |
| 7,236,477 | B2 | 6/2007 | Emeott et al. |
| 7,486,952 | B1 | 2/2009 | Davies et al. |
| 8,140,845 | B2 | 3/2012 | Buddhikot et al. |

(Continued)

FOREIGN PATENT DOCUMENTS

| | | |
|---|---|---|
| EP | 1 124 397 | 8/2001 |
| EP | 1 422 875 | 5/2004 |

(Continued)

OTHER PUBLICATIONS

Extended Search Report for European Patent Application 11151744.7, dated Mar. 15, 2011.

(Continued)

*Primary Examiner* — Fatoumata Traore

(57) ABSTRACT

A communication network manages key material. A method generates and provides session keys from a security node to an access node for further propagation during handoff procedures, without requiring the security node to take part in the handoff procedures.

11 Claims, 2 Drawing Sheets

(56) References Cited

U.S. PATENT DOCUMENTS

| | | | |
|---|---|---|---|
| 2002/0197979 A1 | 12/2002 | Vanderveen | |
| 2003/0051140 A1* | 3/2003 | Buddhikot et al. | 713/169 |
| 2003/0115460 A1 | 6/2003 | Arai | |
| 2004/0066764 A1 | 4/2004 | Koodli et al. | |
| 2004/0077335 A1 | 4/2004 | Lee et al. | |
| 2004/0103275 A1* | 5/2004 | Ji et al. | 713/150 |
| 2004/0203783 A1 | 10/2004 | Wu et al. | |
| 2004/0236939 A1* | 11/2004 | Watanabe et al. | 713/150 |
| 2007/0064647 A1 | 3/2007 | Prasad | |

FOREIGN PATENT DOCUMENTS

| | | |
|---|---|---|
| GB | 2 377 589 | 1/2003 |
| JP | 10-164045 | 6/1998 |
| JP | 2003-188885 | 7/2003 |
| JP | 2004-166270 | 6/2004 |
| JP | 2004-208073 | 7/2004 |
| WO | WO-2005/027560 | 3/2005 |

OTHER PUBLICATIONS

Final Office Action on U.S. Appl. No. 11/186,901, mailed Mar. 27, 2012.

Final Office Action on U.S. Appl. No. 11/186,901, mailed May 3, 2010.

First Office Action issued on Chinese Application 200680012486.4, dated Jan. 26, 2011.

Non-Final Office Action on U.S. Appl. No. 11/186,901, mailed Oct. 28, 2009.

Non-Final Office Action on U.S. Appl. No. 11/186,901, mailed Nov. 3, 2011.

Non-Final Office Action on U.S. Appl. No. 11/186,901, mailed Dec. 10, 2010.

Non-Final Office Action on U.S. Appl. No. 11/186,901, mailed May 23, 2011.

Notice of Allowance on U.S. Appl. No. 11/186,901, mailed Jun. 13, 2012.

Notification of Reasons for Rejection for Japanese Application 2008-505992, mailed Dec. 7, 2010.

Office Action on Japanese Application 2008-505992, mailed Apr. 17, 2012.

The International Preliminary Report on Patentability and Written Opinion of the International Searching Authority for PCT/IB2006/001555 dated Oct. 16, 2007.

The International Search Report for PCT/IB2006/001555 mailed on Jan. 1, 2007.

Uri Blumenthal, et al.—XP-001141703, "A Scheme for Authentication and Dynamic Key Exchange in Wireless Networks", 2002, pp. 37-48.

* cited by examiner

EXCHANGE OF KEY MATERIAL

CROSS-REFERENCE TO RELATED PATENT APPLICATIONS

This application is a divisional of U.S. application Ser. No. 11/186,901, filed Jul. 22, 2005, which has issued as U.S. Pat. No. 8,295,488, which claims priority to Finnish Application 20050393, filed Apr. 15, 2005.

FIELD

This disclosure relates to managing of key material, specifically in a communications network.

LIST OF ACRONYMS

AAAL AAA Local
ACS Access Control Server
AP Access Point
CT Context Transfer
KDC Key Distribution Center
ME Mobile Equipment
MT Mobile Terminal
SA Security Association
SK Session Key
UE User Equipment.

TECHNOLOGICAL BACKGROUND

A communication system is a facility that enables communication between two or more entities such as user terminal equipment and/or network entities and other nodes associated with a communication system. The communication may comprise, for example, communication of voice, electronic mail (email), text messages, data, multimedia and so on.

The communication may be provided by fixed line and/or wireless communication interfaces. A feature of wireless communication systems is that they provide mobility for the users thereof. An example of a communication system providing wireless communication is a public land mobile network (PLMN). An example of the fixed line system is a public switched telephone network (PSTN).

A cellular telecommunication system is a communications system that is based on the use of radio access entities and/or wireless service areas. The access entities are typically referred to as cells. Examples of cellular telecommunication standards includes standards such as GEM (Global System for Mobile communications), GPRS (General Packet Radio Servers), AMPS (American Mobile Phone System), DAMPS (Digital AMPS), WCDMA (Wideband Code Division Multiple Access), UMTS (Universal Mobile Telecommunication System) and CDMA 2000 (Code Division Multiple Access 2000).

The advent of wireless LAN (WLAN) technology has started efforts to use WLAN technology as a basis of or as a part of a wireless communication network. For example, a WLAN network can according to some current plans act as an access network of a cellular communication system. Known WLAN based designs typically use solutions known from fixed IPv4 or IPv6 networks as such or modified to suit the practical requirements of wireless operations. In a similar vein, use of many other types of local connectivity such as Bluetooth, infrared or even cable connections to local access nodes have been planned. Consequently, a mobile terminal may well be able to connect to a communications network over a plurality of physical connections such as fixed wires, short-range radio or infrared links, or medium to long range radio links, according to local availability of networks and connection modes.

Currently, arranging security for connections between a mobile terminal and an access node is an area of high interest. Various solutions have already been proposed, but there are still plenty of remaining problems in the prior art.

For example, it is known to distribute one session key to a plurality of access nodes and to a mobile terminal. This solution has the disadvantage, that if the security of one of these access nodes is breached, an attacker may be able to break the security of communications between the mobile terminal and the communication system using a session key obtained from the breached access node.

One drawback of some known solutions is that a security node of the communication network is required to take part in handoff procedures in order to provide a session key to a mobile terminal and to an access node to which the mobile terminal is attempting to connect. This produces a requirement that the security node needs to be able to respond quickly in order not to slow down handoff procedures. This requirement can be a heavy burden, as generation of keys can be processor intensive, especially when high security levels are required. In an environment where there are large numbers of mobile terminals and access nodes, this requirement can be especially heavy due to high frequency of handoffs. A solution which does not require the participation of a security node in a handoff procedure is needed.

One known solution for providing session keys to a mobile terminal and access nodes is to have a security node to send the session keys to the mobile terminal, which then provides session keys to access points as needed. This has the drawback, that the mobile terminal needs to store the session keys, and to communicate them to access points, which increases storage and signalling requirements.

Arranging authentication between access nodes is also a problem. One known solution is to arrange preshared keys between access nodes which are required to communicate to each other, and for example use IPSec technology to secure and authenticate the connection. Such a solution has the drawback that these preshared keys need to be installed in the access nodes, which increases complexity and signalling.

Use of asymmetric cryptography for deriving cryptographically separate session keys between communicating parties is known. For example, if a mobile terminal and an access node both have a public and secret key pair, they can negotiate a session key based on their key pairs. Such a negotiation and key derivation process may be heavy for devices with low processing capacity. A solution providing cryptographically separate session keys for communication between a mobile terminal and an access node without synchronized asymmetric key derivation during handoff procedures and synchronized signalling with a security node during the handoff procedures is needed.

During a handoff procedure, i.e. a procedure in which a mobile terminal transfers an ongoing connection from one access node to another, exchange of information related to the ongoing communication session needs to be arranged between the two access nodes. This information is often called the session context. This information exchange should be encrypted and integrity protected to prevent eavesdropping and attacks by malicious or spoofed access nodes. For this, the access nodes need keys for encryption and decryption of the session context data and the associated signalling. One possible solution would be to establish a security association between each pair of access nodes that can be expected to need to communicate between each other, but this can be a heavy management burden if the number of access nodes is large.

SUMMARY

Embodiments of the present disclosure aim to overcome one or several of the above problems.

According to one aspect of the disclosure, a method for a mobile terminal for a communications network is provided. The method comprises the steps of receiving a key from a security node, deriving a session key at least in part on the basis of the received key, and encrypting at least a part of a message with the derived session key for transmission of the message to an access node.

The derivation of a session key can be performed also at least in part on the basis of information received from an access node.

According to a second aspect of the invention, a method for an access node of a communications network is provided. The method comprises at least the steps of receiving session context information, extracting an encrypted session key from the received session context information, decrypting the encrypted session key with a key associated with a security association between the access node and a security node of the communications network, and encrypting at least part of a message with the decrypted session key for transmission of the message to a mobile terminal.

The method can further comprise the steps of receiving an encrypted common session protection key, decrypting the received common session protection key with a key associated with a security association between the access node and a security node of the communications network, decrypting at least a part of a message received from another access node with the decrypted common session protection key.

The method can further comprise the steps of decrypting an access node session key with the decrypted session key, and decrypting at least a part of a message received from another access node with a decrypted access node session key.

According to a third aspect of the invention, a method for a security network element for a communications network is provided. The method comprises the steps of establishing a first security association with a first access node, establishing a second security association with a second access node, generating a first session key for communications between the first access node and a mobile terminal, generating a second session key for communications between the second access node and the mobile terminal, encrypting the first session key with a key associated with the first security association, encrypting the second session key with a key associated with the second security association, and transmitting the encrypted first and second keys to the first access node.

The method can further comprise the steps of generating a common session protection key associated with a mobile terminal, encrypting the common session protection key with a key associated with the first security association for producing a first encrypted common session protection key, encrypting the common session protection key with a key associated with the second security association for producing a second encrypted common session protection key, transmitting the first encrypted common session protection key to the first access node.

The second encrypted common session protection key can be transmitted by the security node to the first access node, or for example to the second access node.

According to a fourth aspect of the invention, a mobile terminal for a communications network is provided. The mobile terminal comprises at least means for receiving a key from a security node, means for deriving a session key at least in part on the basis of the received key, and means for encrypting at least a part of a message with the derived session key for transmission of the message to an access node.

The means for deriving a session key can be configured to derive a session key at least in part on information received from an access node.

These means can advantageously be implemented using software program code means executed in a processor of the mobile terminal.

According to a further aspect of the invention, an access node for a communications network is provided. The access node comprises means for receiving session context information, means for extracting an encrypted session key from the received session context information, means for decrypting the encrypted session key with a key associated with a security association between the access node and a security node of the communications network, and means for encrypting at least part of a message with the decrypted session key for transmission of the message to a mobile terminal.

The access node can further comprise means for receiving an encrypted common session protection key, means for decrypting a received common session protection key with a key associated with a security association between the access node and a security node of the communications network, and means for decrypting at least a part of a message received from another access node with a decrypted common session protection key.

The access node can also further comprise means for decrypting a received common session protection key with a session key associated with the access node and a mobile terminal.

These means can advantageously be implemented using software program code means executed in a processor of the access node.

According to a still further aspect of the invention, a security node for a communications network is provided. The security node comprises at least means for establishing a security association an access node, means for generating a session key for communications between an access node and a mobile terminal, means for encrypting a generated session key with a key associated with an established security association with an access node, means for transmitting an encrypted session key to an access node.

The security node can further comprise means for generating a common session protection key associated with a mobile terminal, means for encrypting a generated common session protection key with a key associated with a security association, and means for transmitting an encrypted common session protection key to an access node.

These means can advantageously be implemented using software program code means executed in a processor of the security node.

According to an even further aspect of the invention, a method for handoff between a first access node and a second access node in a communications network is provided. The method comprises at least the steps of receiving a handoff request from a mobile terminal by the second access node, transmitting a session context request by the second access node to the first access node, transmitting session context information from the first access node to the second access node, extracting an encrypted session key from the received session context information by the second access node, decrypting the encrypted session key with a key associated with a security association between the second access node and a security node of the communications network, encrypting at least part of a message with the decrypted session key for transmission of the message to the mobile terminal, and transmitting the message to the mobile terminal.

The invention also provides a software program product for a mobile terminal. The software program product comprises computer software code means for carrying out the steps of the independent method claim covering a method for a mobile terminal.

The invention also provides a software program product for an access node. The software program product comprises computer software code means for carrying out the steps of the independent method claim covering a method for an access node.

The invention also provides a software program product for a security node. The software program product comprises computer software code means for carrying out the steps of the independent method claim covering a security node.

These software program products can be provided in different ways, such as software source code or as compiled object code or as executable code. The software program products can be provided on different types of media, such as on a magnetic or optical disk, or in solid-state memory such as flash memory.

According to a further aspect of the invention, an access node for a communications network is provided. The access node comprises a receiver for receiving session context information, an extractor for extracting a session key from the session context information;

a decryptor for decrypting the session key with a key associated with a security association between an access node and a security node of a communications network; and an encryptor for encrypting at least part of a message with the session key for transmission of the message to a mobile terminal.

The access node can further comprise a receiver for receiving an encrypted common session protection key;

a decryptor for decrypting a received common session protection key with the key associated with a security association between the access node and the security node of the communications network; and a decryptor for decrypting at least a part of a message received from another access node with a decrypted common session protection key.

The access node can further comprise a decryptor for decrypting a received common session protection key with another session key associated with the access node and the mobile terminal.

According to a further aspect of the invention, a security node for a communications network is provided. The security node comprises a processor for establishing a security association with an access node; and a session key generator for generating a session key for communications between the access node and a mobile terminal;

an encryptor for encrypting the session key with a key associated with the security association with the access node; and a transmitter for transmitting the session key to the access node.

The security node can further comprise a session key generator for generating a common session protection key associated with the mobile terminal;

an encryptor for encrypting a generated common session protection key with the key associated with a security association; and a transmitter for transmitting an encrypted common session protection key to the access node.

BRIEF DESCRIPTION OF THE DRAWINGS

Embodiments of the present invention will now be described by way of example with reference to the accompanying drawings, in which.

DETAILED DESCRIPTION OF EMBODIMENTS

Figure 1:
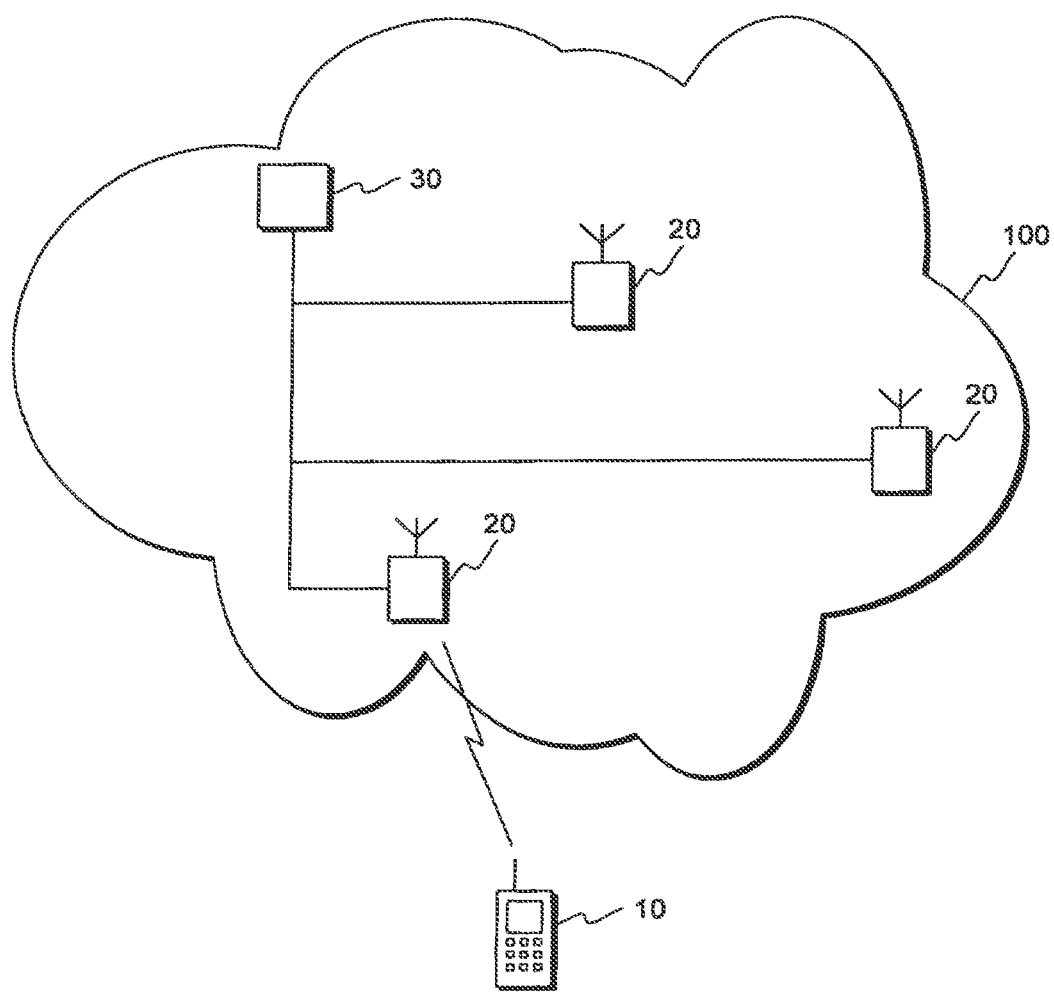
FIG. 1 illustrates a security node, access nodes, and a mobile terminal.

FIG. 1 illustrates an example of a network structure as a background to the description of various embodiments of the invention. FIG. 1 shows a communication network 100 having a security node 30 and a plurality of access nodes 20, and a mobile terminal 10 communicating with an access node 20 of the communication network 100. In FIG. 1, the communication between the mobile terminal and the access node is as an example illustrated as being wireless. The communication network 100 comprises many other nodes as well, and may be connected to one or more further networks (such as a core network, or other types of communication networks), but such other nodes and networks are not illustrated in FIG. 1 for reasons of clarity. The security node can be a separate node, or part of a node that includes other functionalities as well. The network can comprise more than one security node. The communication network can employ wireless or fixed connections to mobile terminals. The communication network can employ many different types of wireless connections to mobile terminals, such as WLAN, Bluetooth, GEM, or CDMA connections, or for example connections following 3GPP standards.

The following description describes key derivation and signalling performed by a security node, access nodes, and a mobile terminal. A security node is a communication network node which creates keys for communication, and may include other functionality as well. In certain specifications for a wireless communication network the functionality of a security node can be a part of the functionality of a key distribution center (KDC). An access node can be a wireless access point, a base station, or for example an access router which a mobile terminal can access with a wired connection. A mobile terminal can be a cellular phone, a WLAN (Wireless Local Area Network) terminal, a wired terminal, or for example a combination device having many of these capabilities.

In the following, we describe generation and transmission of session key material during a handoff procedure according to an embodiment of the invention. In this explanation, it is assumed that the mobile terminal and the security node have previously set up a security association (SA_MT). Based on this security association they share a key, called in the following a RK (Root Key). It is also assumed that the security node has previously set up security associations (SA_AP1, SA_AP2, ..., SA_APn) with a plurality of access nodes (AP1, AP2, ..., APn). The security association between the security node and the mobile terminal as well as those between the security node and the access nodes can be based on symmetric or asymmetric cryptographic keys.

The security node derives session keys (SK_AP1, ..., SK_APn) with a predetermined key derivation function (KDF) from the root key for certain number of access nodes (AP1, ..., APn). The encryption step may also include performing of additional steps for integrity protection of the created material. Each session key SK_APi is then encrypted (and optionally further integrity protected) with a key associated with the corresponding SA_APi and named in such a way that at least the corresponding access node APi can identify it.

The security node sends this material to the current access node that the mobile terminal is communicating with. Session keys encrypted with SA_APi keys are stored on the current access node (for example in a session context information structure, SC_AP).

When the mobile terminal performs a handoff from a first access node APx to a second access node APy the information associated with the communication session, i.e. session context SC_AP, is transferred from the first access node APx to the second access node APy. The second access node APy finds from the information (session context) the session key (SK) that was encrypted for it with the key associated with the security association SA_APy between the APy and the security node, and decrypts it. The mobile terminal knows the identity of the second access node APy and derives the session key (SK_APy) using the same predetermined function and the root key as the security node. This derivation can be based for example on the root key, at least a part of identity information of the second access node APy, and information exchanged between the mobile terminal and the access node APy (which information can comprise e.g. nonces). Both the mobile terminal and the second access node APy now have a session key SK that is cryptographically separate from the session key used in communication between the mobile terminal and the first access node APx. Both the access node APy and the mobile terminal can further derive multiple keys based on the session key SK.

If the second access node APy cannot find a session key derived for it in the material sent by the first access node APx, it can request new session context material from the security node, which then derives a new session context and sends it to the second access node APy. In a further embodiment, the first access node APx can request new session context material from the security node, if it observes that the current session context does not contain a session key for a neighbouring access node such as the second access node APy. This is possible, if the access node APx knows the identities of its neighbouring access nodes. Such an early request for new session context material would minimize time and signalling in case the mobile terminal actually later happens to perform a handoff to the second access node APy.

In another embodiment of the invention, the session keys for the access nodes are generated without reference to a root key. The session keys can advantageously be cryptographically separate keys. The security node can generate the keys in many different ways, and the invention is not limited to any specific way, as a man skilled in the art can easily devise different ways of generating keys. In this embodiment, the session keys are sent by the security node to the mobile terminal. The session keys can advantageously be encrypted by the security node using a key associated with the security association (SA_MT) between the security node and the mobile terminal. In this embodiment, the mobile terminal does not derive the session key for use with the second access node APy, but extract the session key from the information sent by the security node. The mobile terminal can extract the correct key from the plurality of keys based on the identity information of the second access node APy.

In case the mobile terminal knows which access nodes the session context contains keys for (for example in case the session keys are derived in the security node and sent to the mobile terminal), it knows which access nodes have a session key for communicating with it. In case MT contacts an access node APz which does not have a session key for communication with the mobile terminal, the mobile terminal can notify the security node about the situation, whereafter the security node can create new session context material for both the mobile terminal and the access node APz and transmit the new session context material to them.

In a further embodiment of the invention, the security node sends information required for derivation of session keys to the mobile terminal. This information is advantageously encrypted using a key associated with the security association (SA_MT) between the security node and the mobile terminal. The information can comprise for example salt values, or any other information. The information can also include a root key for deriving session keys, if no such root key has been negotiated or transferred during setting up of the security association between the security node and the mobile terminal.

In a further embodiment, the information required for derivation of session keys can include an access node specific nonce for each access node for which a key is to be derived, in which nonce the session key derivation is bound. A nonce can be shorter than a session key with an adequate level of security, whereby transmission of nonces for derivation of corresponding session keys instead of the session keys themselves reduces the amount of required storage and signalling.

In an embodiment of the invention, an access node can send information to the mobile terminal for use in derivation of a session key. For example, such information can be a nonce.

Advantageously, the encrypted keys in a session context which are intended for use by a specific access node are associated with an identifier of that access node. This identification allows an access node to find and extract the key information it needs from the session context information. This identification also allows and access node to select which key information to send first to a second access node, in case the access node does not send all context information in a single message.

In an embodiment of the invention, the keys are not associated with an access node identifier, but can be associated with each of a plurality of access nodes by their ordering in the session context information. This ordering can be based for example in a numeric or alphabetic ordering of the access node identifiers, or in some other predetermined ordering scheme.

In a still further embodiment of the invention, the trust relationships between each access node and the security node are used to secure and verify communications between the access nodes. In this embodiment, the security node creates a common session protection key for a mobile terminal, and transmits the common session protection key to a plurality of access nodes. Advantageously, the security node encrypts the common session protection key before transmission. Advantageously, the security node uses the session key SK_APn which is used for communication between the mobile terminal and an access node APn to encrypt the copy of the common session protection key sent to that APn, so that only that access node APn is able to decrypt that common session protection key. This common session protection key can be used to sign and/or encrypt at least part of session context information and/or messages associated with exchange of session context information between two access nodes. Each access node can then decrypt and/or check the signature of received session context information and/or messages using the common session protection key. The security node can transfer the encrypted copies of the common session protection key for example in the session context to one access node in which case the encrypted copies of the common session protection keys propagate to other access nodes along with the rest of the session context information. The security node can also transfer each encrypted copy of the common session protection key directly to the corresponding access node.

This embodiment has the advantage that there is no need to maintain and manage separate security associations between the access nodes, as authentication between access nodes reuse the security associations between the security node and the access nodes. In such a case where the session key SK_APn is used to encrypt the common session protection key, there is the additional advantage that the session context is bound to both the mobile terminal and the access node APn.

In cases in which the number of access nodes for which the session keys need to be generated by the security node is large, the amount of information in the session context may be large. In a further embodiment of the invention, the security node can assign a session key to more than one access node. This has the disadvantage of slightly lower level of security, but the advantage that the session context size is smaller. The invention is not limited to any specific way of assigning a session key to more than one access node. The assigning can be done for example in a random way, or according to a predetermined algorithm.

In an embodiment of the invention, the communications between two access nodes are secured by having the security node create keys for pairwise communications between an access node and each of its neigbouring access nodes, and using these keys for securing the communications. This embodiment provides a higher level of security than the previously described embodiment using a common session protection key. In this embodiment, the security node prepares an access node session key for communications between an access node and each of a plurality of its neighbouring access nodes. For example, if an access node AP1 has two close neighbours AP2 and AP3, the security node could prepare one access node session key (SK_AP1_AP2) for securing communications between AP1 and AP2, and another access node session key (SK_AP1_AP3) for securing communications between AP1 and AP3. The security node then preferably encrypts these access node session keys with a key associated with the security association between the security node and the access node AP1 for transmission to the access node AP1. Advantageously, the security node may also encrypt these keys with the session key SK_MT_AP1 which the access node AP1 needs for communication with the mobile terminal. This second encryption would bind the keys to the identity of the mobile terminal as well.

In a further embodiment, the security node creates such pairwise keys for decryption by each of the concerned access points. Continuing the previous example in the previous paragraph, the security node in this embodiments also creates access node session key SK_AP2_AP1 for securing communications between AP2 and AP1, and access node session key SK_AP2_AP3 for securing communications between AP2 and AP3, and encrypts these two access node session keys with a key associated with the security association between the security node and the access node AP2 for transmission to the access node AP2. Optionally, the security node can also encrypt these keys with the session key SK_MT_AP2 which the access node AP2 needs for communication with the mobile terminal. Further in this example, the security node performs the same for AP3, i.e. generates access node session keys SK_AP3_AP1 and SK_AP3_AP2, and encrypts them in a similar way. Advantageously, the security node inserts this encrypted key material in the current session context, in which the keys then propagate to the access node needing them. The number and identities of access nodes for which the security node creates all these keys is an implementation detail depending on the structure of the particular network, and processing and storage capacities of the involved network nodes. Hence, the invention is not limited to any specific number of access nodes for which these keys are generated.

Figure 2:
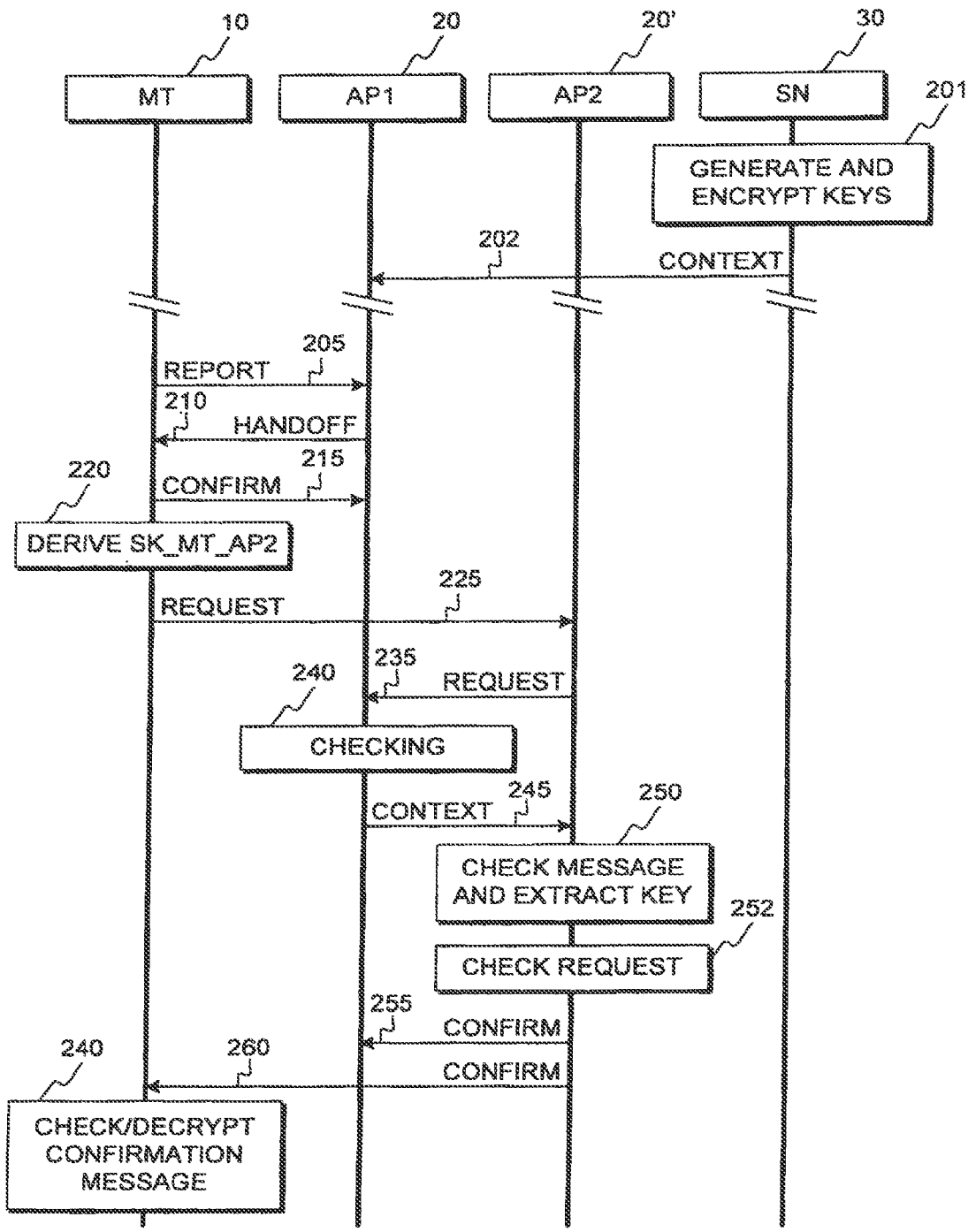
FIG. 2 illustrates signalling between a mobile terminal, access nodes and a security node according to an embodiment of the invention.

FIG. 2 illustrates signalling according to an embodiment of the invention. FIG. 2 illustrates signalling between a mobile terminal (MT) 10, a first access node (AP1) 20, a second access node (AP2) 20', and a security node (SN) 30.

In step 201, the security node generates session keys for communication between the mobile terminal and the access point, namely one key SK_MT_AP1 for communication between the mobile terminal and the first access point AP1, and one key SK_MT_AP2 for communication between the mobile terminal and the second access point AP2. The security node also encrypts the created keys so that each session key can only be decrypted by the intended recipient access node. This can be done for example as described previously in this specification, by encrypting SK_MT_AP1 using a key associated with a security association between the security node and the first access point AP1, and SK_MT_AP2 using a key associated with a security association between the security node and the second access point AP2. The security node inserts the encrypted keys into session context information for transmission to the first access node AP1. As described previously in this specification, the security node may also generate, encrypt and include in the context information also other keys, such as keys for securing communications between the access nodes.

In step 202, the security node transmits the session context information to the first access node. Steps 201 and 202 can happen a relatively long time before a handoff becomes necessary, i.e. before any handoff activity even begins.

A handoff procedure can be executed in many different ways. FIG. 2 illustrates only one example, in which the handoff is commanded by the currently active access node based on a measurement report transmitted by the mobile terminal.

However, as a man skilled in the art knows, a handoff can be triggered in many other ways, and the signalling associated with the handoff can proceed in many different ways.

In step 205, the mobile terminal sends a measurement report regarding the received signal levels of neighbouring access nodes to the first access node AP1. As a result, the first access node transmits a command for initiating a handoff to the mobile terminal in step 210. In step 215, the mobile terminal transmits a confirmation message back to the first access node in order to indicate, that the mobile terminal has received the handoff command and is going to initiate the handoff.

In step 220, the mobile terminal derives the session key SK_MT_AP2 for communication with the second access node, for example in one of the ways described previously in this specification. In other embodiments of the invention, the mobile terminal can proceed in a different way, for example by extracting the session key from information previously sent to it by the security node.

In step 225, the mobile terminal transmits a request for handoff to the second access node AP2. The mobile terminal signs and/or encrypts at least a part of the request message with the session key SK_MT_AP2 in order to secure the communication. In this example, the mobile terminal also signs and/or encrypts at least a part of the request message with the session key SK_MT_AP1 in order to secure the communication.

In step 235, the second access node AP2 transmits a request for context information to the first access node AP1. In this request, the second access node may forward signed and/or encrypted information received from the mobile terminal in step 225. Such information can include e.g. identifiers of AP1, AP2 and the mobile terminal as well as other pieces of information, and the first access node can verify that the request is a legitimate one resulting from a handoff request from the mobile terminal by checking the signature and/or decrypting the information in step 240.

In step 245, the first access node transmits the session context (or at least a part of it that includes information relevant to AP2) to the second access node AP2. In step 250, the second access node checks that the message is valid, for example by using a common session protection key as described previously. In step 250, the second access node AP2 also extracts the session key SK_MT_AP2 from the received context information, and decrypts the key as described previously.

Transmission of only a part of the session context to AP2 first, i.e. the part of the session context that is relevant to AP2, and transmitting the rest of the session context information later has the advantage, that AP2 can process the relevant part of the session context quickly and continue handling packet traffic quickly, without the reception and processing of the rest of the session context information delaying continuation of these activities any further.

In step 252, the second access node AP2 decrypts and/or checks the signature of the information received from the mobile terminal in step, which information was at least in part encrypted and/or signed with the session key SK_MT_AP2.

In step 255, the second access node transmits a confirmation to the first access node that the session context has been received.

In step 260, the second access node transmits a handoff confirmation to the mobile terminal signed and/or encrypted with the SK_MT_AP2 key. After this, the mobile terminal can continue communicating with the second access node, and if there were any buffered data waiting at the first access node for transmission to the mobile terminal, the first access node can transmit these to the second access node, which then can forward them to the mobile terminal.

In step 270, the mobile terminal encrypts and/or checks the signature of the handoff confirmation message.

The invention has many advantages. For example, the invention provides cryptographically separate session keys for communications between access nodes without the need for synchronously communicating with the security node during a handoff of a mobile terminal from one access node to another. Further, there is no need to do asymmetric cryptographic operations to create cryptographically separate session keys during a handoff.

Because security node does not need to be involved with the handoffs, the system becomes more scalable as there are no strict real-time requirements for the performance of the security node.

The invention also has the advantage that the mobile terminal does not have to send the session keys to the access nodes, thus reducing signalling. The invention also reduces the amount of signalling during handoffs, since in most cases signalling specific to key derivation is not needed during handoffs.

Embodiments of the invention also allow access nodes to authenticate access nodes without any need to establish security associations between the access nodes, or any need to install access node specific certificates or keys in the access nodes for authentication between access nodes.

The invention also removes the need to distribute session keys to a plurality of access nodes before a handoff. An access node receives the session key only when it is needed, in the transmission of session context information.

In the embodiment in which the session keys for communication between the mobile terminal and the access nodes are derived from a root key (RK), the mobile terminal does not need to store these session keys, thus saving storage space.

One further advantage is that the invention enables a source access node to send the session context in multiple packets. This is a large advantage in cases, where the MTU (Maximum Transmission Unit) of the transmission path between the access nodes is smaller than the resulting size of a single packet including the whole session context. A further advantage is that a source AP can also elect to send only the entry concerning the target AP first instead of the whole session context.

It is also noted herein that while the above describes exemplifying embodiments of the invention, there are several variations and modifications which may be made to the disclosed solution without departing from the scope of the present invention as defined in the appended claims.

What is claimed is:

1. A method for arranging security for a communications network, the method comprising:
   receiving session context information at an access node;
   extracting, at the access node using a processor, a session key from the session context information, wherein the session key is based upon a root key that is shared by a mobile terminal and a security node;
   decrypting, at the access node, the session key with a key associated with a security association between the access node and the security node of a communications network;
   encrypting, at the access node, at least part of a message with the session key for transmission of the message to the mobile terminal;
   receiving a common session protection key at the access node;

decrypting the common session protection key with the key associated with the security association between the access node and the security node of the communications network; and decrypting at least a part of another message received from another access node with the common session protection key.

2. The method according to claim 1, further comprising:
decrypting an access node session key with the session key; and decrypting at least a part of another message received from another access node with a decrypted access node session key.

3. A method for arranging security for a communications network, the method comprising:

establishing, via a security network element, a first security association with a first access node;

establishing, via the security network element, a second security association with a second access node;

generating a first session key at the security network element for securing communications between the first access node and a mobile terminal, wherein the first session key is derived based upon a root key that is shared by the mobile terminal and the security network element;

generating a second session key at the security network element for securing communications between the second access node and the mobile terminal, wherein the second session key is derived based upon the root key that is shared by the mobile terminal and the security network element;

encrypting, at the security network element using a processor, the first session key with a first key associated with the first security association;

encrypting, at the security network element, the second session key with a second key associated with the second security association;

transmitting the first and second keys to the first access node from the security network element;

generating a common session protection key associated with a mobile terminal;

encrypting the common session protection key with the first key associated with the first security association for producing a first encrypted common session protection key;

encrypting the common session protection key with the second key associated with the second security association for producing a second encrypted common session protection key; and transmitting the first encrypted common session protection key to the first access node.

4. The method according to claim 3, further comprising transmitting the second
encrypted common session protection key to the first access node.

5. The method according to claim 3, further comprising transmitting the second encrypted common session protection key to the second access node.

6. A method for handoff between a first access node and a second access node in a communications network, the method comprising:

receiving a handoff request from a mobile terminal by a second access node;

transmitting a session context request by the second access node to a first access node;

receiving session context information from the first access node at the second access node;

extracting a session key from the session context information by the second access node using a processor, wherein the session key was derived based upon a root key that is shared by the mobile terminal and a security node;

decrypting the session key with a key associated with a security association between the second access node and the security node of the communications network;

encrypting at least part of a message with the session key for transmission of the message to the mobile terminal;

transmitting the message to the mobile terminal;

receiving a common session protection key at the access node;

decrypting the common session protection key with the key associated with the security association between the access node and the security node of the communications network; and decrypting at least a part of another message received from another access node with the common session protection key.

7. A non-transitory computer-readable medium having computer-readable instructions stored thereon that, when executed by a processor, cause a computing device to:

receive session context information;

extract a session key from the session context information, wherein the session key was derived based upon a root key that is shared by a mobile terminal and a security node;

decrypt the session key with a key associated with a security association between an access node and the security node of a communications network;

encrypt at least a part of a message with the session key for transmission of the message to the mobile terminal;

receive a common session protection key at the access node;

decrypt the common session protection key with the key associated with the security association between the access node and the security node of the communications network; and decrypt at least a part of another message received from another access node with the common session protection key.

8. A non-transitory computer-readable medium having computer-readable instructions stored thereon that, when executed by a processor, cause a computing device to:

establish a first security association with a first access node;

establish a second security association with a second access node;

generate a first session key for securing communications between the first access node and a mobile terminal, wherein the first session key is derived based upon a root key that is shared by a mobile terminal and the computing device;

generate a second session key for securing communications between the second access node and the mobile terminal, wherein the second session key is derived based upon the root key that is shared by the mobile terminal and the computing device;

encrypt the first session key with a first key associated with the first security association;

encrypt the second session key with a second key associated with the second security association;

transmit the first and second keys to the first access node;

receive a common session protection key at the access node;

decrypt the common session protection key with the key associated with the security association between the access node and the security node of the communications network; and decrypt at least a part of another message received from another access node with the common session protection key.

9. An access node for a communications network, the access node comprising:

a receiver configured to receive session context information;

an extractor configured to extract a session key from the session context information, wherein the session key was derived based upon a root key that is shared by a mobile terminal and a security node;

a decryptor configured to decrypt the session key with a key associated with a security association between an access node and the security node of a communications network;

an encryptor configured to encrypt at least part of a message with the session key for transmission of the message to the mobile terminal;

a receiver configured to receive an encrypted common session protection key;

a decryptor configured to decrypt a received common session protection key with the key associated with a security association between the access node and the security node of the communications network; and a decryptor configured to decrypt at least a part of a message received from another access node with a decrypted common session protection key.

10. The access node according to claim 9, further comprising a decryptor configured to decrypt a received common session protection key with another session key associated with the access node and the mobile terminal.

11. A security node for a communications network, the security node comprising:

a processor configured to establish a security association with an access node;

a session key generator configured to generate a session key for communications between the access node and a mobile terminal, wherein the session key is derived based upon a root key that is shared by the mobile terminal and the security node;

an encryptor configured to encrypt the session key with a key associated with the security association with the access node;

a transmitter configured to transmit the session key to the access node;

a session key generator configured to generate a common session protection key associated with the mobile terminal;

an encryptor configured to encrypt a generated common session protection key with the key associated with a security association; and a transmitter configured to transmit an encrypted common session protection key to the access node.

* * * * *